Oct. 1, 1957  R. R. HOLLIEN ET AL  2,808,085
HAND PORTABLE ELECTRIC POWER UNIT
Filed Aug. 18, 1955  3 Sheets-Sheet 1

INVENTORS.
RICHARD R. HOLLIEN
EUGENE L. STAIGER
BY Chapin & Neal
ATTORNEYS

Oct. 1, 1957

R. R. HOLLIEN ET AL 2,808,085

HAND PORTABLE ELECTRIC POWER UNIT

Filed Aug. 18, 1955

INVENTORS.
RICHARD R. HOLLIEN
EUGENE L. STAIGER

BY *Chapin & Neal*

ATTORNEYS

United States Patent Office 2,808,085
Patented Oct. 1, 1957

2,808,085
HAND PORTABLE ELECTRIC POWER UNIT

Richard R. Hollien, Shelburne Falls, and Eugene L. Staiger, Greenfield, Mass., assignors to Millers Falls Company, Greenfield, Mass., a corporation of Massachusetts Application August 18, 1955, Serial No. 529,097

2 Claims. (Cl. 144—35)

This invention relates to hand operable electric power units comparable to the type commonly known as electric drills and adapted for use with various tools and attachments for manipulating while supported in the hand or with other attachments while held stationary on a work bench stand device. In particular the invention relates to novel mounting support structure incorporated in the casing of this type of hand operable electric power unit and in combination therewith an attachment comprising a component of a tool adapted to be carried on a mounting support of the unit.

An object of the invention is to provide a novel mounting construction for the casing of a hand portable power unit which will enable the application of a multiplicity of tool attachments to the electric power unit by means of a common clamping means unique to all the attachments and incorporated in the various assemblies, each of these assemblies being formed as a characteristic component of the tool with which the particular unit is adapted to be applied for its normal use.

Other specific objects and advantages of the invention as a whole and of the particular construction of certain forms thereof will be apparent from the following description. In the drawings, Fig. 1 is a side elevational view of the motor casing of an electric hand operable power unit;

Figure 1:
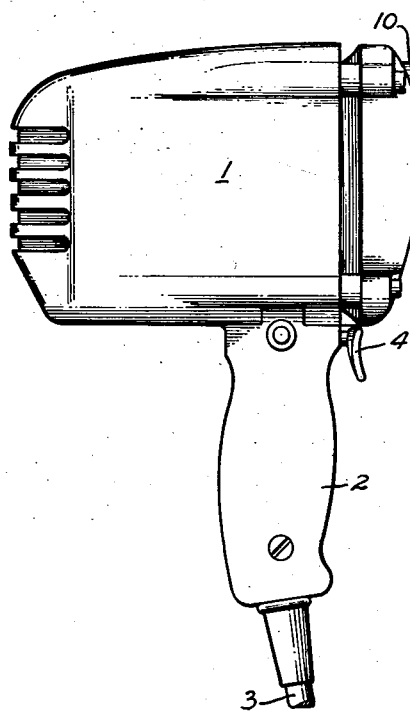
Figure 2:
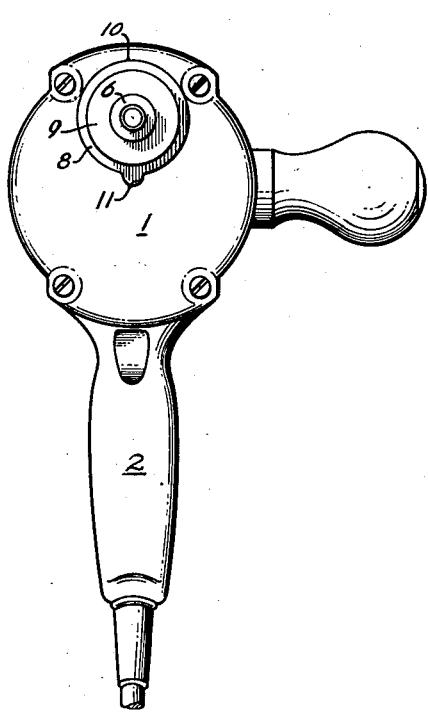
Fig. 2 is a front elevational view thereof.

In the drawings a hand operable portable power unit is shown by Figs. 1 and 2 having a motor casing frame 1 and a hand grip 2, with an electric cord 3 leading into the lower end of the handle and a trigger switch lever indicated at 4 at the top of the grip.

At the fore part of the frame 1 a projecting cylindrical bearing housing indicated generally at 5 is provided in which it will be understood a suitable bearing (not shown) may be located for a power shaft 6 which extends beyond the end of the housing. The extreme end of the shaft is reduced and threaded as at 7 for attachment of an ordinary drill chuck device and particularly for other attachments and tools as will become apparent.

The projection 5 is an elongated housing and adjacent the main frame casing 1 is formed with a shoulder at 8 from which the housing 5 extends to its outer end in the form of a true cylinder 9 having a uniform cross-sectional diameter throughout its length. This cylinder as will be seen is adapted to receive a coupling member formed as a characteristic component of a tool desired for use with the power unit. The inner enlarged cylindrical shouldered portion of the bearing housing as at 10 is provided with a small lug at 11 forming a projection extending radially outwardly of the portions 9 and 10 in predetermined angular relationship to the hand grip 2 and as will be seen is to fix the tool components or tool assembly attachments in correctly positioned relation to the motor casing and its hand grip.

Figure 3:
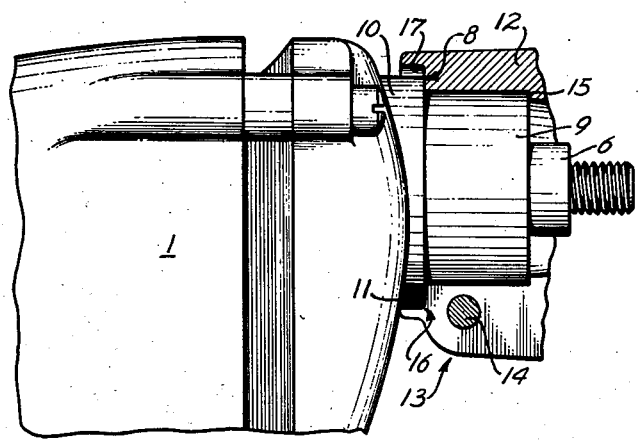
Fig. 3 is a fragmentary side elevational view on an enlarged scale of the motor casing and drive shaft bearing housing with the coupling portion of an attachment indicated in assembled position.

In Fig. 3 a fragmentary portion of a coupling member 12 of a tool component is shown. The coupling portion 12 is in the form of a cylindrical collar having a longitudinally split wall as at 13. A clamp screw bolt as at 14 draws the split section together to draw the collar down and anchor it on the housing 9. The collar 12 is also here provided interiorly of its socket with a shoulder at 15 to abut the forward face of portion 9.

At the open end of the socket of the split collar portion one or more radially directed recesses having a predetermined angular relationship thereto are provided depending on the particular tool component of which the collar 12 is a portion. Two recesses are shown at 16 and 17, respectively, in the example illustrated by Fig. 3. The lower recess 16 in Fig. 3 is located at the split wall section and is shown as receiving the lug 11 in seated position on the element 9. It will be realized that lug 11 will thus act as a key to find and position the component of the collar relative to the casing as may be desired.

The particular component of the tool to be selected for use with the casing of the power unit determines the location of the recess or recesses in the mouth of collar portion. It will be seen from a consideration of the various components illustrated in the remaining figures that it may be desirable to provide a plurality of positions in some instances and in others a single position.

Figure 4:
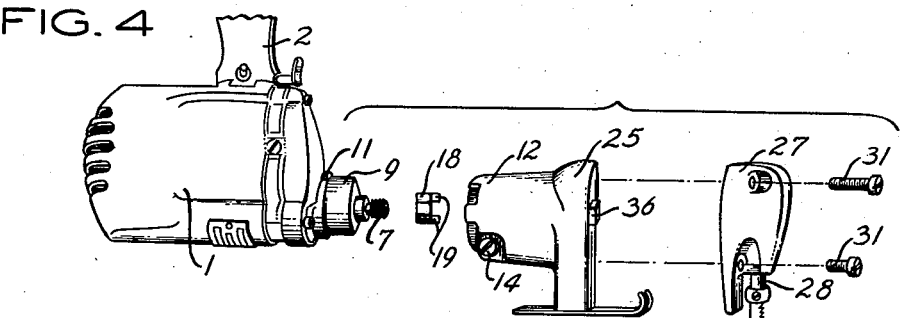
Fig. 4 is an exploded view on a reduced scale of a jig saw tool attachment for use with the unit of Figs. 1–3.
Figure 5:
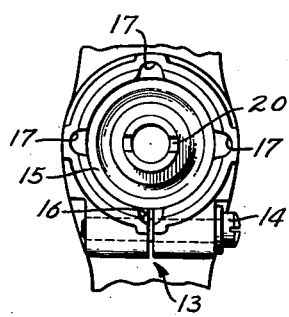
Fig. 5 is a face view of the coupling end of the jig saw attachment of Fig. 4.
Figure 6:
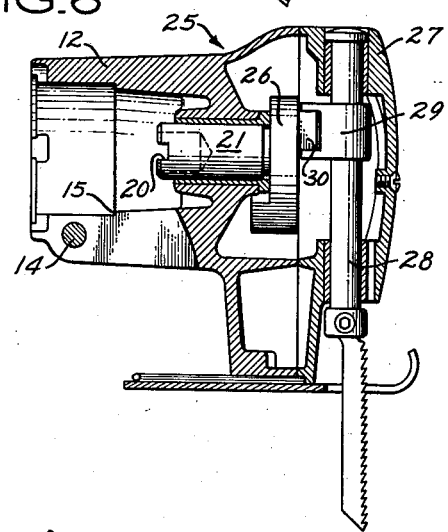
Fig. 6 is a longitudinal sectional view of the jig saw tool of Fig. 4.

Referring now to Figs. 4, 5 and 6 a jig saw attachment is illustrated for use with the power unit and with which it is desirable to provide a series of positions so as to obtain the desired working angle of the blade with respect to the casing 1. It will be readily seen that in manipulating the casing and saw attachment as one assembly, the assembly can be handled more conveniently and guided more easily if the blade is in a proper positional relationship. So too if the power unit is stationarily mounted on a bench stand a particular piece of work may require the blade to be set at a different angle relative to the handles. Accordingly, there is provided as best shown by Fig. 5 the radially extending recesses 16 and 17 in upper and lower diametrically opposite positions, and at 90° therefrom the oppositely positioned recesses also indicated by numeral 17. This will obviously enable the coupling to be keyed and anchored to the bearing housing portion 9 at 90° turns and serve to increase the versatility of the saw for a great variety of working applications.

The jig saw attachment as will be seen from Figs. 4–6 is adapted to be assembled in operative position by sliding the socket of the split coupling portion 12 over the end of the bearing housing 9 of the power unit. With this attachment a driver element 18 (Fig. 4) is initially threaded on the end 7 of the power shaft or spindle. The coupling is first turned to register a pair of projecting horns 19 of the driver 18 in a pair of recesses 20 in the face of a shaft 21 for the saw, and then the desired recess 16 or 17 may be mated with the lug 11. The coupling is then moved inwardly on the housing to seat the shoulder 15 against the end face of housing 9. The screw bolt 14 is tightened and the collar secured to the bearing.

In this embodiment of the invention the component of the jig saw tool in which the coupling portion 12 is formed comprises the power take-off frame 25 in which is housed a plunger drive shaft 21 and counterweighted crank wheel 26 driven thereby. A tool housing 27 carries a reciprocable saw plunger 28 on which a cross head 29 is fixed to be reciprocably driven by the crank pin block 30. The housing 27 is fixed to housing 25 by the screw bolts 31.

Figure 7:
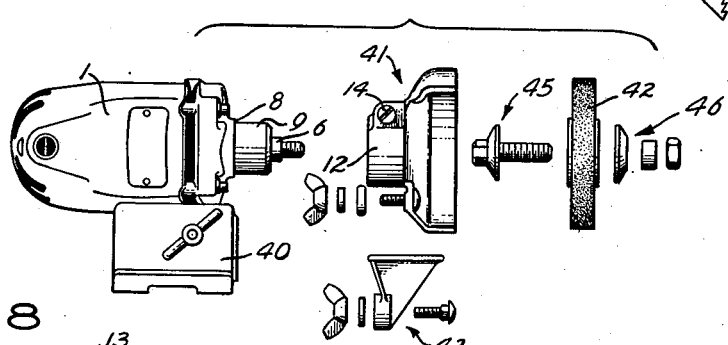
Fig. 7 is an exploded view of a grinding wheel and guard attachment for coupling to the unit.
Figure 8:
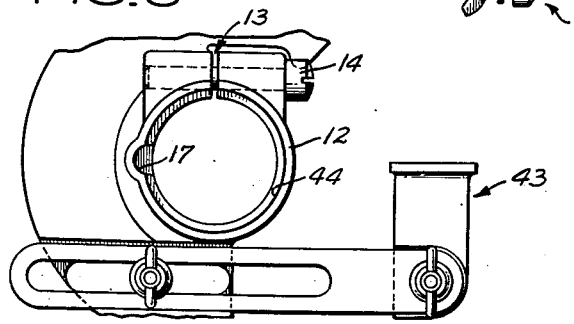
Fig. 8 is a face view of the coupling end portion of the guard shown by Fig. 7.

A grinding wheel attachment is illustrated by Figs. 7 and 8. In this embodiment a suitable bench stand as at 40 is desirable to fix the assembly in a stationary manner. The housing is rigidly mounted on the stand and the coupling component characterizing the tool to be used with the power unit is shown at 41. The coupling member 41 is, as will readily be noted, in the form of a guard for the abrasive wheel 42. In Fig. 8 an end face view of the coupling end is shown with a work rest 43 assembled on the guard. The coupling portion 12 is shown with its split wall at 13 facing upwardly and the recess 17 at 9 o'clock position. As will be noted the frame 1 is disposed on its side with the handle (not here shown) extending horizontally behind the frame. The lug 11 is thus on the far side of the bearing housing 9 and will be received in the recess 17 when the wheel guard coupling member is moved to the left as in Fig. 7. The shoulder at 44 (Fig. 8) will abut the shoulder 8 (Fig. 7) in assembled position, and the screw bolt 14 is then turned to anchor the coupling securely. A wheel arbor 45 is shown for turning on the threaded power shaft 6 and the wheel 42 may then be mounted in place on the arbor in the usual fashion by the parts indicated at 46.

Figure 9:
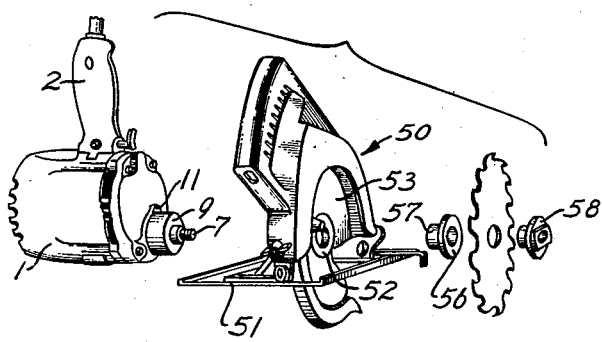
Fig. 9 is an exploded view in perspective of a portable circular saw rig with a coupling attachment consisting of a blade guard and shoe.
Figure 10:
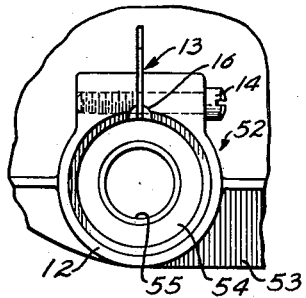
Fig. 10 is a fragmentary face view of the coupling portion of the attachment of Fig. 9.

A portable circular saw attachment tool coupling is also illustrated as embodying the invention by Figs. 9 and 10. In the exploding view of Fig. 9 the coupling member as a characterizing component of a portable saw tool comprises the hand grip and guard frame 50 with shoe 51. The coupling portion is an enlarged collar 52 integrally formed centrally of the circular wall 53. The split clamping portion 12 of the collar as shown by Fig. 10 provides a socket extending from the wall 53 and has a recessed annular abutment at 54 against which the face of the cylindrical housing 9 is engaged with the shaft 6 extending centrally through the opening 55 into the recess of the guard. The radially directed lug recess at 16 is at the top of the collar and formed between the split 13 of the wall. It will be seen that the guard component 50 is assembled by clamping the collar portion 12 on the housing 9 as above described. Indicated at 56 is an inside collar which seats around the shaft 6 with its reduced portion 57 fitting into the opening 55. The blade is then placed against the outer end of the collar 56 on the shaft and a screw blade nut 58 is threaded on the end 7 to hold the saw between the nut and collar.

Figure 11:
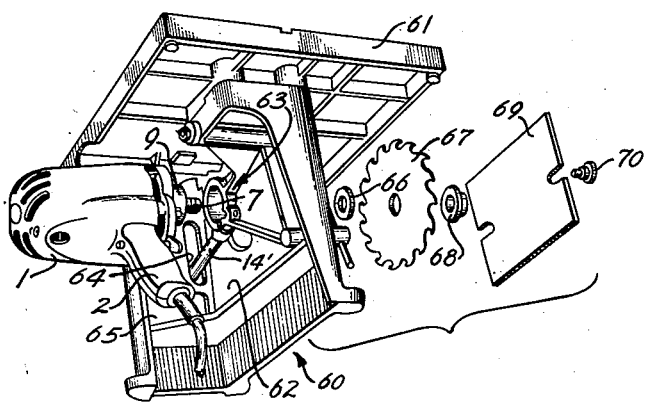
Fig. 11 is an exploded view in perspective from the underside of a bench saw attachment.
Figure 12:
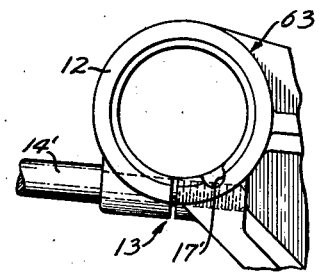
Fig. 12 is a fragmentary face view of the coupling portion of the saw rig of Fig. 11.

A still further attachment embodying the invention is shown by Figs. 11 and 12. In this form the power unit is itself hung on a bench saw attachment tool component. A bench rig 60 adapted to be suitably fixed on a platform surface is provided with a horizontal table portion 61 and a vertical supporting wall at 62. Spaced from the top of wall 62 is a centrally disposed supporting coupling portion 63 formed as an integral flanged collar to receive the bearing housing 9 of the power unit 1. As shown by Fig. 12 the split wall 13 is at the base of the coupling clamp portion 12. A radially directed recess 17' is set at an angle to the split as at a 5 o'clock position so as to provide a convenient working angle to manipulate the motor casing unit 1 under the overhang of the table. A clamp screw bolt 14' draws the split wall together for clamping and as indicated in Fig. 11 has an elongated stem extending through a side wall 65 of the vertical support. The stem may be suitably turned from the outside of the wall 65 once the bearing 9 is inserted in the portion 12. As indicated by Fig. 11 an inner collar 66 is placed over the threaded stem 7 with a saw 67 against it. A blade nut 68 is then threaded on the stem to fix the saw on the shaft. A saw cover 69 is indicated with an attaching screw at 70 for fixing to the vertical support.

It will be noted that in each of the several forms of the tool attachments shown the coupling member characterizes a component of the tool which may be assembled on the power unit and that a final seating position is afforded by the lug 11 being received in the radially directed recess of the coupling socket.

What is claimed is:

1. In a hand portable electric power unit, a motor casing frame having a generally transversely-extending hand grip and a longitudinally-extending elongated spindle housing projecting therefrom for journaling a power shaft extending beyond the housing, said housing having a circular cross section substantially throughout its length, a rigid lug extending radially outwardly from said housing at its inner end adjacent the frame, said rigid lug being in predetermined angular relation to said hand grip, and a tool assembly attachment in predetermined angular relationship to the hand grip of the frame, said attachment comprising means for connecting a tool element to the power shaft, a coupling member having characterizing means associated with the tool element, said coupling member including a sleeve portion which engages the said housing substantially throughout its length, said sleeve having a recess opening at its outer end and disposed in predetermined angular relationship to the characterizing means, which recess receives the rigid lug to position the motor frame and particularly its hand grip in predetermined angular relationship with respect to the entire tool assembly attachment and particularly the characterizing means thereof and means for detachably securing said coupling means in the described position on said housing.

2. In a hand portable electric power unit, a motor casing frame having a generally-transversely extending hand grip and a generally longitudinally-extending elongated spindle housing projecting therefrom for journaling a power shaft extending beyond the housing, said housing having a circular cross section substantially throughout its length, a rigid lug extending radially outwardly from said housing at its inner end adjacent the frame, said rigid lug being in predetermined angular relation to said hand grip, and a tool assembly attachment in predetermined angular relationship to the hand grip of the frame, said attachment comprising means for connecting a tool element to the power shaft, a coupling member having a workpiece guide associated with the tool element, said coupling member including a sleeve portion which engages the said housing substantially throughout its length, said sleeve having a recess opening at its outer end and disposed in predetermined angular relationship to the workpiece guide which recess receives the rigid lug to position the motor frame and particularly its hand grip in predetermined angular relationship with respect to the entire tool assembly attachment and particularly the workpiece guide thereof and means for detachably securing said coupling member in the described position on said housing.

References Cited in the file of this patent

UNITED STATES PATENTS

| | | |
|---|---|---|
| 1,793,053 | Cahill et al. | Feb. 17, 1931 |
| 1,808,228 | Hulack et al. | June 2, 1931 |
| 2,282,728 | Kern | May 12, 1942 |
| 2,645,438 | Kalikow | July 14, 1953 |
| 2,662,562 | Lindell | Dec. 15, 1953 |